Figure 1:
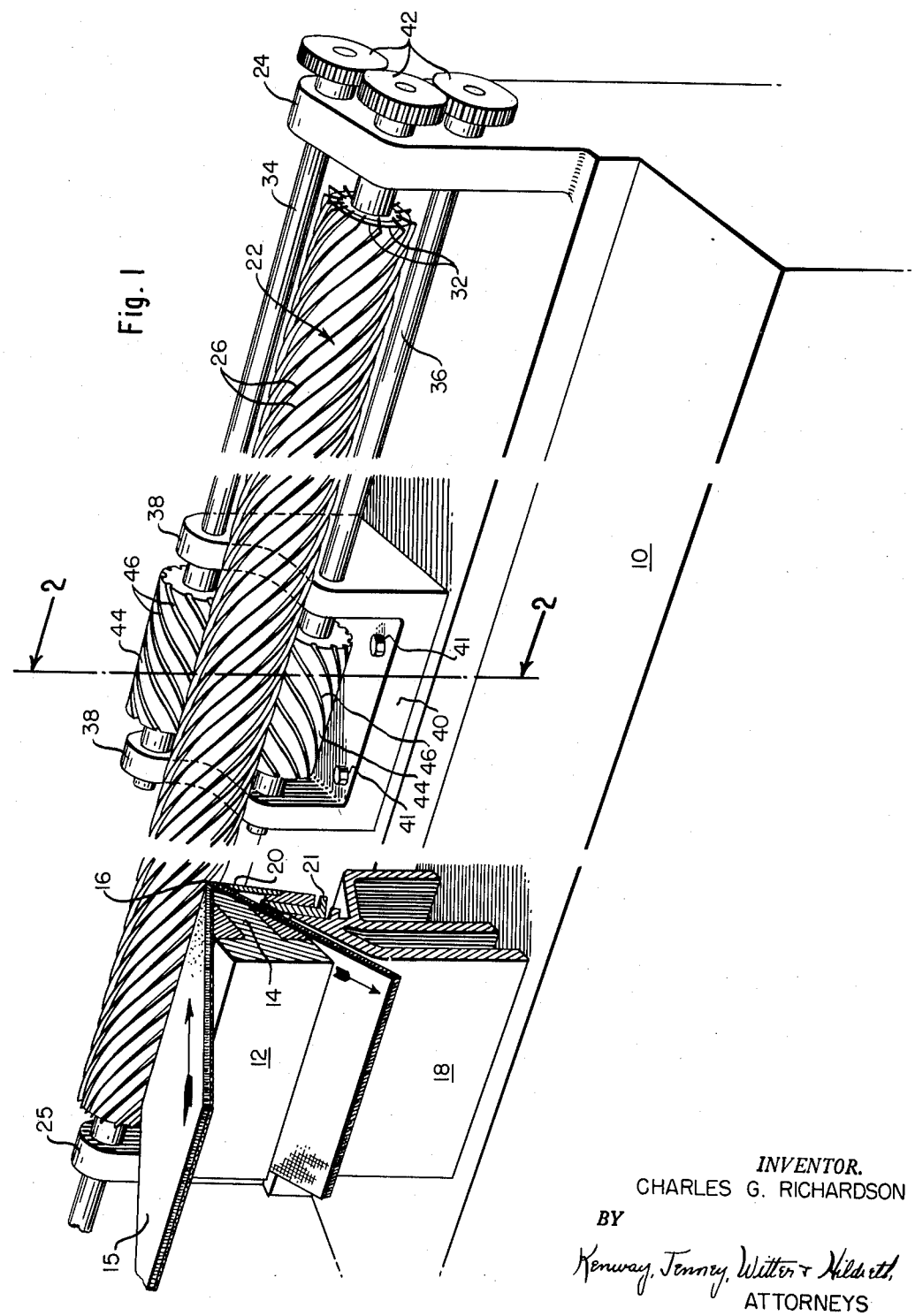

Jan. 31, 1956

C. G. RICHARDSON 2,732,608

CLOTH SHEARING MECHANISM

Filed Nov. 4, 1952

2 Sheets—Sheet 1

INVENTOR.
CHARLES G. RICHARDSON
BY
Kenway, Jenney, Witter & Hildreth
ATTORNEYS

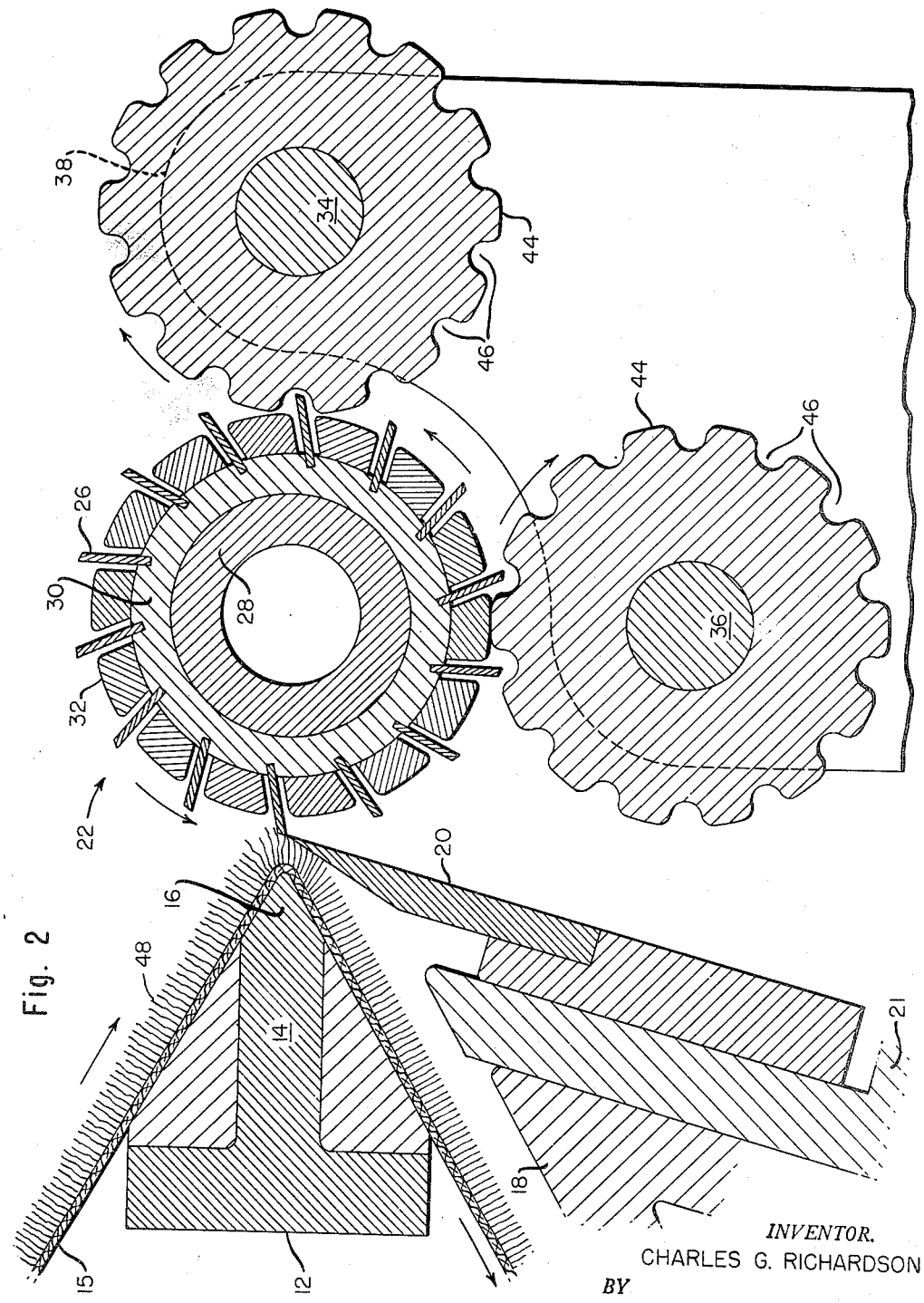

United States Patent Office 2,732,608
Patented Jan. 31, 1956

2,732,608

CLOTH SHEARING MECHANISM

Charles G. Richardson, Springfield, Vt., assignor to Parks & Woolson Machine Co., Springfield, Vt., a corporation of Vermont Application November 4, 1952, Serial No. 318,605

3 Claims. (Cl. 26—15)

This invention relates to cloth shearing mechanism utilizing a rotary cylindrical member having shearing blades coacting with a stationary ledger knife to shear the protruding fibers at the surface of the cloth to a uniform level. For this purpose, the cloth is run rapidly through the machine and past the shearing devices in flat and open relation, the cloth being supported in close proximity to the coacting blades by means of a rest solidly supporting the cloth at the shearing line.

Carpeting and rugs are made in substantial widths well up to and possibly greater than 200 inches and require shearing blades of a corresponding length. The possible R. P. M. of a rotary shearing member of this length is quite limited due to the inherent sag or deflection of its own weight. In common usage, shearing members are rotated at around 1200 R. P. M. but rotation of such relatively long members at a speed exceeding 200–400 R. P. M. introduces whip and vibration that render these high speeds impractical and impossible, and it will be apparent that reduction of the speed to that required very substantially reduces the shearing output. The primary object of my invention resides in the production of a new and novel combination in which these long shearing members are supported intermediately of their ends in a manner retaining the shearing member in true alignment with the ledger knife and supporting the shearing member against sagging whereby high shearing speeds are rendered possible without whipping and vibration.

The rotary shearing member is provided with spaced and longitudinally extending shearing blades at its periphery and is supported in end bearings for rotation on its longitudinal axis. A ledger knife is disposed longitudinally of the member and in shearing cooperation with its blades. In accordance with my invention I provide one or more cylindrical rotors for supporting the shearing member intermediately of its ends, the rotors being in supporting contact with the member between its blades and being recessed longitudinally to receive the blades thereinto during rotation of the member, thereby supporting the member in true alignment and permitting its rotation at high speeds without whip or vibration. The production of a novel shearing combination of this nature and for the purpose described comprises a further object of the invention.

These and other features of the invention will be best understood and appreciated from the following description of a preferred embodiment thereof selected for purposes of illustration and shown in the accompanying drawing in which—

Fig. 1 is a fragmentary perspective view of a cloth shearing mechanism embodying my invention, and Fig. 2 is an enlarged cross sectional view taken on line 2—2 of Fig. 1.

In the drawings 10 indicates a portion of the frame of a cloth shearing machine. Supported on and extending transversely across the frame is a cloth supporting rest or bar 12 supported at its ends on the frame and having a forwardly extending portion 14 about which the cloth 15 is fed in open width and held at an apex 16 along a straight shearing line. Supported on a portion 18 of the frame is an upwardly extending ledger knife 20 vertically adjustable in a support 21 and having its cutting edge disposed along the apex 16.

Cooperating with the ledger knife 20 is a shearing cylinder 22 rotatably mounted at its ends in bearing supports 24 and 25 of the frame and having longitudinally extending blades 26 cooperating with the knife 20. The shearing cylinder is adapted to be driven by any convenient power means connected to one end thereof. The shearing cylinder comprises a steel tube 28 having suitably spaced rings 30 thereon and secured thereto. The rings are slotted to receive the shearing blades 26 which are anchored securely within the slots, similar to that shown in my Patent 2,606,355, the blades 26 preferably being disposed helically about the cylinder as illustrated. Mounted on the rings between the blades are bearing strips 32 which can be of steel, bronze, plastic or such other material as will serve the bearing function hereinafter described.

Disposed along the shearing cylinder 22 and rotatably mounted at their outer ends in the bearing support 24 are two shafts 34 and 36. The shafts are supported at their inner ends in two spaced uprights 38 of a block 40 bolted firmly at 41 to the frame 10 intermediately of the ends of the cylinder and the shafts are connected to rotate at equal speeds with the shearing cylinder as by gearing 42. The shaft 34 is located at the side of the shearing cylinder opposite to that of the ledger knife 20 and the shaft 36 is located beneath the shearing cylinder. On each of the shafts 34 and 36 between the uprights 38 is mounted a cylindrical rotor 44 parallel with and in supporting contact with the shearing cylinder, and each rotor is recessed longitudinally at 46 to provide recesses for receiving the blades 26.

As the cloth or carpet 15 is fed rapidly over the rest 14 in the direction indicated by the arrow the blades 26 of the shearing cylinder 22 cooperates with the ledger knife 20 to trim the threads 48 to uniform length. When operating on relatively wide cloth requiring a long shearing cylinder, the employment of the rotors 44 serves to support the cylinder against whip and vibration, thereby permitting high rotary speeds. It will be noted that the rotors are in constant contact with the bearing strips 32 between the blades and that the grooves 46 receive the blades thereinto. Preferably one rotor is disposed opposite the ledger knife and maintains the shearing cylinder in true alignment therewith and the other rotor is disposed beneath and supports the cylinder against sag due to its weight. The shearing cylinder is thereby maintained in true shearing alignment with the ledger knife and supported against sagging, thereby permitting high speed operation without loss of efficiency and shearing accuracy.

Having thus disclosed my invention what I claim as new and desire to secure by Letters Patent is:

1. In a cloth shearing machine a shearing cylinder having spaced and longitudinally extending blades on its periphery, end bearings supporting the shearing cylinder for rotation on its longitudinal axis, a ledger knife extending longitudinally of the shearing cylinder in shearing cooperation with the blades, a cylindrical rotor parallel with and in peripheral supporting contact with the shearing cylinder between its blades, the rotor being located at the side of the shearing cylinder opposite to that of the ledger knife and supporting the shearing cylinder to maintain its blades in shearing relation with the ledger knife, bearings supporting the rotor for rotation on its longitudinal axis, the rotor being recessed longitudinally thereof to receive the blades thereinto, and means connecting the shearing cylinder and rotor for rotation on their axes at equal peripheral speeds.

2. In a cloth shearing machine a relatively long shearing cylinder having spaced and longitudinally extending blades on its periphery, end bearings supporting the shearing cylinder for rotation on its longitudinal axis, a ledger knife extending longitudinally of the shearing cylinder in shearing cooperation with the blades, thereof, rotor means parallel with the cylinder and in peripheral contact therewith between but free from contact with said blades for supporting the cylinder against sag and maintaining its blades in shearing relation with the ledger knife, the rotor means being substantially shorter than the shearing cylinder and located intermediately between said end bearings, and means connecting the shearing cylinder and rotor means for rotation on their axes at equal peripheral speeds.

3. In a cloth shearing machine, a relatively long shearing cylinder having spaced and longitudinally extending blades at its periphery, end bearings supporting the shearing cylinder for rotation on its longitudinal axis, a ledger knife extending longitudinally of the shearing cylinder in shearing cooperation with the blades thereof, a cylindrical rotor parallel with and in peripheral supporting contact with an intermediate portion of the shearing cylinder between its blades and located at the side of the shearing cylinder opposite to that of the ledger knife, the ledger knife and rotor being disposed laterally and at opposite sides of the shearing cylinder, a like cylindrical rotor disposed beneath and in like supporting contact with the shearing cylinder, bearings supporting the rotors for rotation on their longitudinal axes, the rotors being recessed longitudinally thereof to receive the blades thereinto, and means connecting the rotors for rotation on their longitudinal axes at equal peripheral speeds with the shearing cylinder.

References Cited in the file of this patent
UNITED STATES PATENTS

| Number | Name | Date |
| --- | --- | --- |
| 299,940 | Sutton | June 3, 1884 |
| 1,225,596 | Driscoll | May 8, 1917 |
| 1,967,726 | Sherman | July 24, 1934 |
| 2,261,315 | Thorsen | Nov. 4, 1941 |
| 2,417,771 | Maigis | Mar. 18, 1947 |
| 2,615,230 | Cluett | Oct. 28, 1952 |